(12) United States Patent
Zhu et al.

(10) Patent No.: US 10,162,651 B1
(45) Date of Patent: Dec. 25, 2018

(54) SYSTEMS AND METHODS FOR PROVIDING GAZE-BASED NOTIFICATIONS

(71) Applicants: Feng Zhu, Madison, AL (US); Mini Zeng, Madison, AL (US); Sandra Carpenter, Madison, AL (US)

(72) Inventors: Feng Zhu, Madison, AL (US); Mini Zeng, Madison, AL (US); Sandra Carpenter, Madison, AL (US)

(73) Assignee: Board of Trustees of the University of Alabama, for and on behalf of the University of Alabama in Huntsville, Huntsville, AL (US)

(*) Notice: Subject to any disclaimer, the term of this patent is extended or adjusted under 35 U.S.C. 154(b) by 116 days.

(21) Appl. No.: 15/438,335

(22) Filed: Feb. 21, 2017

Related U.S. Application Data

(60) Provisional application No. 62/297,006, filed on Feb. 18, 2016.

(51) Int. Cl.
*G06F 3/048* (2013.01)
*G06F 9/451* (2018.01)
*G06K 9/00* (2006.01)

(52) U.S. Cl.
CPC .......... *G06F 9/453* (2018.02); *G06K 9/00604* (2013.01)

(58) Field of Classification Search
CPC .................................................. G06K 9/00604
USPC ........................................................ 715/710
See application file for complete search history.

(56) References Cited

U.S. PATENT DOCUMENTS

| 8,395,656 | B1 | 3/2013 | Malzbender et al. |
| 9,355,612 | B1 | 5/2016 | Shepard et al. |
| 9,457,914 | B1 | 10/2016 | Cline |
| 9,505,413 | B2 | 11/2016 | Laine |
| 9,530,065 | B2 | 12/2016 | Tsimhoni |
| 9,823,936 | B2* | 11/2017 | Baklanovs ............ G06F 9/4446 |
| 2009/0115965 | A1* | 5/2009 | Waldorf ................ A61B 3/113 351/210 |
| 2010/0033333 | A1* | 2/2010 | Victor .................... A61B 3/113 340/576 |

(Continued)

OTHER PUBLICATIONS

Shonesy, et al., "UAH Research Studies Cyberattacks Through the Lens of EEG and Eye Tracking," https://www.uab.edu/news/innovation/item/6640-uab-research-studies-cyberattacks-through-the-lens-of-eeg-and-eye-tracking, Oct. 22, 2015.

(Continued)

*Primary Examiner* — David Phantana-angkool
(74) *Attorney, Agent, or Firm* — Maynard Cooper & Gale, P.C.; Jon E. Holland (57) ABSTRACT

A computer system may track the user's eye gaze on a display device over time using an eye tracker. When the computer system detects a risk associated with a graphical object and determines that the user's gaze is close to the graphical object, it may display a warning message indicating the risk. The computer system may display the warning message at a location that corresponds to the graphical object associated with the risk. Furthermore, when the computer system detects a risk and determines that the user's gaze is not at the graphical object that needs the user's immediate attention, it may display a warning message near the user's current gaze to notify the user. If desired, the warning message may be hidden based on the user's gaze, such as when the user moves his gaze away from the detected risk.

27 Claims, 7 Drawing Sheets

(56) References Cited

U.S. PATENT DOCUMENTS

| | | |
|---|---|---|
| 2012/0094700 A1 | 4/2012 | Karmarkar et al. |
| 2012/0271484 A1 | 10/2012 | Feit et al. |
| 2013/0058529 A1* | 3/2013 | Levin .................... A61B 3/113 |
| | | 382/103 |
| 2013/0235347 A1 | 9/2013 | Hennessey et al. |
| 2013/0321772 A1* | 12/2013 | White ................ G06K 9/00604 |
| | | 351/209 |
| 2014/0354538 A1* | 12/2014 | Lee ......................... G06F 3/013 |
| | | 345/156 |
| 2015/0070262 A1 | 3/2015 | Peters et al. |
| 2015/0113666 A1 | 4/2015 | Buck |
| 2015/0160726 A1* | 6/2015 | Sullivan .................. G06F 3/013 |
| | | 345/156 |
| 2015/0251771 A1* | 9/2015 | Whitlow ................ B64D 45/00 |
| | | 701/3 |
| 2016/0034141 A1 | 2/2016 | Chaudhri et al. |
| 2016/0094705 A1 | 3/2016 | Vendrow |
| 2016/0188973 A1 | 6/2016 | Ziaja et al. |
| 2017/0123492 A1* | 5/2017 | Marggraff ............. G06F 3/0236 |
| 2017/0200296 A1* | 7/2017 | Jones ....................... G06T 11/60 |
| 2017/0278417 A1* | 9/2017 | Ur ............................ G09B 7/06 |

OTHER PUBLICATIONS

Nelson, et al., "How Eye-Tracking Could Stop PII Leaks," http://www.networkworld.com/article/3042246/security/how-eye-tracking-could-stop-pii-leaks.html, Mar. 10, 2016.

Daisuke, et al., "Eye-Tracking Approach for Enforcing Phishing Prevention Habits," https://hal.archives-ouvertes.fr/hal-01304643/document., Sep. 11, 2014.

\* cited by examiner

SYSTEMS AND METHODS FOR PROVIDING GAZE-BASED NOTIFICATIONS

CROSS REFERENCE TO RELATED APPLICATION

This application claims priority to U.S. Provisional Patent Application No. 62/297,006, entitled "Eye Gaze Based Dynamic Warnings" and filed on Feb. 18, 2016, which is incorporated herein by reference.

STATEMENT REGARDING FEDERALLY SPONSORED RESEARCH OR DEVELOPMENT

This invention was made with Government support under 249506 awarded by the National Science Foundation. The Government has certain rights in the invention.

RELATED ART

People use various types of computers such as smartphones (e.g., iPhone®), desktop computers, laptop computers, tablet computers (e.g., iPad®), wearable computers, and sensors. The computers may have various output interfaces, a monitor, head-up display (e.g., in vehicles), wall displays, or speakers. When people use applications running on these computers to access web and social networks, for business, in virtual reality or augmented reality environments, or even interact with natural environments. They may face various risks—computer security attacks, unnecessary privacy exposures, or other risks in general—and need to be warned or notified via an output visual or audio device of the computers.

Current methods for presenting computer warnings can be ineffective. Sometimes, a warning is displayed at wrong time (too early or too late). Sometimes, a warning disrupts a user when a user is focusing on something else and does not really need the warning. Sometimes, users develop habituation and dismiss warnings without even looking at them. Sometimes, a user also may mistakenly associate an important warning with another less important message. Thus, a heretofore unaddressed need exists for improved techniques for alerting a user to the presence of security risks in a computing environment.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to gaze-based notifications in a computer system. In some embodiments, a computer system may have a display device for displaying a graphical user interface (GUI). A user may see and interact with a plurality of graphical objects displayed by the GUI. The computer system may track the user's eye gaze over time using an eye tracker. When the computer system detects a risk and it is related to the users' current task and/or focus it may display a warning message indicating the risk. The computer system may display the warning message at a location that corresponds to the graphical object associated with the risk. In this manner, the computer system may provide the user a warning about the risk when the user is looking at or near the graphical object associated with the risk.

The computer system may continue to track the user's gaze after it displays the warning message. When the computer system determines that the user's gaze has moved away from the graphical object that is associated with the risk, it may hide the warning message. The computer system also may hide the warning message when it determines that the user has read the warning message. If the computer system determines that the user's gaze moves toward the graphical object again, it may display the warning message again. In some cases, the decision whether to display the warning message may be based on whether it has been previously read by the user. The computer system may display warning messages for each risk. In some embodiments, the computer system may only display a warning message when the user's gaze indicates that user interaction with the graphical object is likely imminent.

In some embodiments, a warning may be related to a risk at an area where the user is looking. For example, a user may visit a website which requires him to input his social security number. When the user looks at the social security number and its input area, the computer system may display a warning to notify the user of the risk. In this regard, the display of the warning is positively related to the area that the user is looking at.

In addition, a warning may be related to a risk that is not at an area where the user is looking (e.g., the display of the warning may be negatively related to the area where the user is looking, and the user should look at another place to mitigate the risk). For instance, when a driver looks at a car's infotainment for too long during driving, a warning message may be displayed to warn the driver to look at the road. As another example, when a doctor is doing telemedicine, there may be multiple sections of the information shown on the display. If one section needs the doctor's immediate attention, but the doctor is looking at other section, a warning may appear near the current eye gaze to notify the risk to the doctor.

A display may be a traditional monitor or any emerging and new types of display. For example, in an augmented reality environment, a surgeon may wear glasses (e.g., Microsoft HoloLens®) during an operation. If the computer system detects a risk condition which is related to the surgeon's current focus and eye gazes (positively or negatively), the computer system may display a warning through the glasses.

A risk condition and a warning notification may be based on the eye gaze information. The warning delivery may be via the display device or may be extended to other forms such as via an audio notification.

Figure 1:
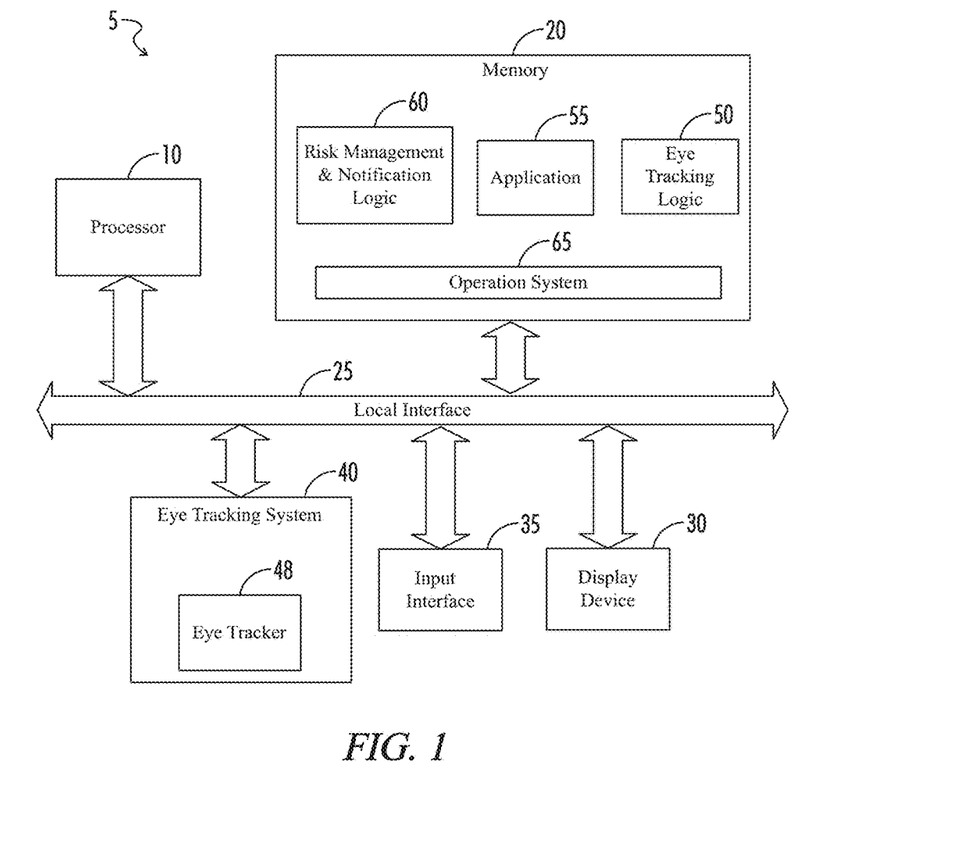
FIG. 1 is a block diagram illustrating an exemplary embodiment of a computer system for providing gaze-based security warnings.

FIG. 1 is a block diagram illustrating an exemplary embodiment of a computer system 5 for providing gaze-based security warnings. The computer system 5 may be of various types, such as a handheld (e.g., a smartphone), a laptop, a desktop, a wearable device, or another other type of system for processing and displaying information. In some embodiments, the computer system 5 may include at least one processor 10, memory 20, local interface 25 (e.g., one or more buses), display device 30, input interface 35 and eye tracking system 40. In some embodiments, computer system 5 uses data from eye tracking system 40 to track a user's gaze and identify a location on the display device 30 where the user is looking. In some embodiments, computer system 5 may include processing hardware for executing instructions stored in memory 20, such as at least one processor 10. As an example, the processor 10 may comprise a central processing unit (CPU) or a digital signal processor (DSP). The processor 10 communicates to and drives the other elements within the computer system 5 via a local interface 25, which can include at least one bus.

Memory 20 may be a tangible storage medium. Examples of tangible (or non-transitory) storage medium include disks, thumb drives, hard drives, and other forms of memory. Tangible computer readable storage medium include volatile and non-volatile, removable and non-removable media, such as computer readable instructions, data structures, program modules or other data. Examples of such media include RAM, ROM, EPROM, EEPROM, flash memory, disks or optical storage, magnetic storage, or any other non-transitory medium that stores information.

Display device 30 may be a video display for displaying content to a user. In some embodiments, display device 30 may be various devices for displaying content, such as a computer monitor, printer, LCD display, touchscreen, head-up display, wearable glasses, projected display into one's eyes, projected onto the real environment, wall size monitor, or otherwise. Display device 30 may comprise various other devices in other embodiments. In an embodiment, display device 30 may be coupled to local interface 45 for exchanging data with the other components of computer system 5. In some embodiments, a user may view a graphical user interface (GUI) and various associated graphical objects via display device 30, as described further below.

Input interface 35 may comprise various components for receiving inputs for computer system 5, such as inputs from a user. In some embodiments, input interface 35 may receive various types of inputs, such as commands from a user (e.g., selection of graphical objects in a GUI). In some embodiments, input interface 35 may comprise various types and combinations of components, hardware, firmware, and software. In some embodiments, input interface 35 may comprise a mouse, keyboard, voice, gesture, control hardware, a device coupled to computer system 5 via wireless link (e.g., Bluetooth) or otherwise. In some embodiments, functionality ascribed to input interface 35 and display device 30 may be combined in various manners, such as when each of input interface 35 and display device 30 are implemented by a touchscreen for both receiving user inputs and displaying content to a user. In addition, input interface 35 may be configured to receive eye-gaze data or other information in some embodiments. Input interface 35 may comprise other devices and components in other embodiments.

Eye tracking system 40 may comprise various components for tracking a gaze of a user and providing eye-gaze data. In some embodiments, the eye tracking system 40 may comprise one or more conventional eye tracking devices, such as one or more eye trackers (e.g., sensors or cameras) 48. The eye tracking system 40 may include various hardware, software, or firmware for interfacing with eye tracker 48 and receiving eye-gaze data and providing the eye-gaze data to the resources of computer system 5 (e.g., for use by processor 10 in executing instructions stored in memory 20). In some embodiments, such as is depicted by FIG. 1, eye tracking system 40 may be housed within computer system 5, but in some embodiments, eye tracking system 40 and its components may communicate with computer system 5 via input interface 35. For example, the eye tracking system 40 may be mounted externally to computer system 5 and may communicate via a wired or wireless communication link of input interface 35. Eye tracking system 40 may include other components, be located within or outside of computer system 5, and provide eye-gaze data and other data to computer system 5 via other techniques in other embodiments.

Eye tracker 48 of tracking system 40 may sense eye-gaze data indicating locations on the display device 30 at which the user is gazing over time and provide the data for use by one or more components of the computer system 5 (e.g., processor 10 executing instructions stored in memory). While the user is interacting with computer system 5, the user's gaze may fixate on and change locations (e.g., periods of fixation and saccade) as the user looks at display device 30 (or user's field of view). The eye tracker 48 may perform substantially continuous sensing of one or more eyes of a user and may provide eye-gaze data as desired, such as during use of the computer system 5. In this manner, locations on the display device 30 where the user is looking may be monitored and compared with locations of risks, as described below. In some embodiments, eye tracker 48 may comprise an infrared (IR) sensor, but in some embodiments, eye tracker 48 may include various types and numbers of sensors, and may be arranged in various combinations for achieving the functionality described herein.

Computer system 5 depicted by FIG. 1 may include various types of resources for performing various functions. FIG. 1 shows an eye tracking logic 50, an application 55, a risk management and notification logic 60 and an operating system 65 stored in memory 20. In the embodiment shown by FIG. 1, such components are implemented in software. However, it is possible for such components or portions of such components to be implemented in hardware, software, firmware or any combination thereof. It will be apparent to one or ordinary skill in the art that functionality ascribed to any particular instructions stored in memory 20 is non-limiting, and may be redistributed or shared among the instructions in memory 20 or other components and resources of computer system 5 as may be desired or necessary to achieve the functionality described herein.

Eye tracking logic 50 and may include instructions for determining locations on the display device 30 where a user is gazing over time based on data from the eye tracker 48. In some embodiments, eye tracking logic 50 may include instructions for receiving eye-gaze data from eye tracker 48, locating one or more eyes of a user within the eye-gaze data, and determining locations on display device 30 where the user is gazing. In some embodiments, the location where the user is gazing may indicate that the user is interested in content (e.g., a graphical object) at a location on the display device 30 where the user is looking. In some embodiments, if the risk is associated negatively with the location that the user is looking at (that is the user should look at another place to mitigate the risk), the location where the user is gazing may indicate that the user is not interested in or focused on content (e.g., a graphical object) at a location on the display device 30.

In some embodiments, the eye tracking logic 50 may include instructions for associating a location where the user is gazing with a location on the display device 30. For example, in some embodiments, the eye tracking logic 50 may receive eye-gaze data from eye tracking system 40 and determine a location on the display device 30 where the user is gazing. In some embodiments, the eye tracking logic 50 may determine the location where the user is gazing using various techniques, such as based on features of one or more eyes of the user and the distance of the eye tracking system to the user's eyes. In some embodiments, the eye tracking logic 50 may include instructions for identifying a pupil of a user and estimating or otherwise identifying a location where the user's eye is gazing based on characteristics of the pupil (e.g., user's eye angle, orientation, pupil sizes, etc.). Eye tracking system 40 and eye tracking logic 50 may be calibrated (e.g., based on calibration specific to computer system 5 and eye tracking system 40) to associate coordinates (e.g., Cartesian coordinates, pixel values, or otherwise) of display device 30 with locations where the user is gazing. Data indicative of the calibration may be available to processor 10 when executing instructions of eye tracking logic 50 (e.g., stored in memory 20) so that eye tracking logic 50 may provide eye-gaze data indicating locations on the display device 30 where the user is looking. In this manner, the user's eye gaze may be monitored for interaction with risks, as described further below.

Application 55 may be implemented in software and may include instructions for displaying a graphical user interface (GUI) and a plurality of graphical objects to the user, such as via display device 30. The GUI may be various graphical environments, and may include various types of graphical objects, such as icons, links, buttons, text, images, etc. The graphical objects may be displayed at various locations within the GUI, in augmented reality, virtual reality, or real environments. In some embodiments, the graphical objects may correspond to locations on the display device 30. Data indicative of locations of each of the plurality of graphical objects may be available for use by other resources of the computer system 5.

Application 55 also may include various instructions for carrying out tasks (e.g., commands), such as performing tasks based on inputs received at input interface 35, based on communication with other data sources (not specifically shown in FIG. 1), or otherwise. In some embodiments, application 55 may include instructions for interacting with a graphical object of the plurality of graphical objects based on an input received at input interface 35 (e.g., input from a user). For example, application 55 may include instructions that are executable in response to various user inputs, such as when user may select a graphical object representing the application 55. The application 55 may include instructions for performing any suitable task in some embodiments for achieving the functionality described herein. Note that there may be more than one application running and interacting with the computer system and the user.

Risk management and notification logic 60 may be implemented in software and may include instructions for associating one or more of the plurality of graphical objects with a risk and displaying a notification related to the current risk. In some embodiments, risk management and notification logic 60 may provide a notification indicative of various conditions that may constitute risks, such as security risks (e.g., when personal or private information may be exposed or otherwise compromised), safety risks (e.g., when a driver is operating a vehicle and needs to watch the road instead of looking elsewhere), or occupational risks (e.g., when a physician performing telemedicine encounters a situation requiring immediate attention). In this regard, a notification related to the risk may simply be informational in nature (that is, less urgent than a warning message), or may be a critically important warning (e.g., when alerting a physician to an urgent development during a medical procedure and directing the physician's attention to the location of the problem). In some embodiments, a notification may be any or a combination of a warning message, an alert, or various other types of notifications appropriate to notify a user of the risk detected by risk management and notification logic 60 and direct the user's attention or focus as desired.

In some embodiments, risk management and notification logic 60 may include instructions for identifying risks (e.g., malicious objects, such as code, hyperlinks, files, etc.) according to various techniques (e.g., using conventional security software instructions, virus detection instructions, etc.). Some risks may be objects which the system 5 has not yet confirmed are safe for user interaction. As an example, a hyperlink may be deemed to be a security risk when the risk management and notification logic 60 has not confirmed that a web site or other resource identified by the hyperlink is safe (e.g., is unknown). When a risk is identified, the risk management and notification logic 60 may include instructions for associating the risk with at least one of the plurality of graphical objects displayed at the display device 30 by GUI of application 55. As an example, a hyperlink for directing the user to an unsafe website or an icon that invokes an unsafe file may be associated with a security risk by the risk management and notification logic 60.

The risk management and notification logic 60 may include instructions for noting a location of the graphical object associated with the security risk, generating a notification indicative of the security risk, and displaying the message within the GUI at a location corresponding to the graphical object if the user's gaze comes within a predefined proximity of the graphical object associated with the security risk. The notification may be displayed within the GUI based on the location of the graphical object within the GUI or the user's field of view, and may include various content to warn a user (e.g., textually, visually, audibly, or otherwise) about the security risk associated with the graphical object. Risk management and notification logic 60 also may include instructions for determining that the user's gaze is within the predefined proximity based on data indicative of the location on display device 30 where user is gazing. Risk management and notification logic 60 may receive such data from eye tracking logic 50, determined as described above.

The predefined proximity used to determine when to display the notification may be any desired location or shape and may be defined or expressed as coordinates, pixels of display device 30, a location of the field of view, or otherwise. In some embodiments, the predefined proximity corresponds to an area that is within a short distance of the graphical object associated with the security risk such that, when the user's gaze enters the predefined proximity, it is likely that the user is looking at the graphical object. In some embodiments, the predefined proximity corresponds to an area that the user is not looking at and thus it is associated with the risk. Such events may indicate that selection or other interaction with the graphical object and/or mitigate the risk by the user is imminent. Note that the risk management and notification logic 60 may include certain criteria for displaying a notification (e.g., "notification criteria"). For example, such criteria may specify that the user's gaze must remain within the predefined proximity for at least a predefined amount of time (e.g., indicative of a period of fixation of the user's gaze) before displaying a notification in order to prevent the display of the notification when the user's gaze inadvertently and temporarily passes near the graphical object without focusing on the graphical object (e.g., indicative of periods of saccade). In addition, the criteria may specify that the notification only should be displayed if the user has not read the message (e.g., if the message has been displayed previously). In some embodiments, additional criteria may be specified for displaying notifications effectively, and when one or more of the criteria is met, risk management and notification logic 60 may display the notification. When a notification (e.g., warning) is displayed, it may be placed in an area near the graphical object where the user is likely to see it before interacting with the graphical object.

Risk management and notification logic 60 may include instructions for removing the message from the GUI when the user is no longer gazing near the graphical object or has read the message. As an example, the risk management and notification logic 60 may determine that the user's gaze has moved out of the predefined proximity or other area based on eye-gaze data from eye tracking logic 50 and stop displaying the message in response. In addition, the risk management and notification logic 60 may determine whether the user has read the message by tracking the user's eye-gaze location. For example, if the user's eye-gaze location moves across the message along the text of the message indicating that the user is likely reading the text, the risk management and notification logic 60 may determine that the user has read the message and, in response, stop displaying the message. In another example, the user was not looking at the area that needs imminent attention. After the warning, the user looks at the area and thus the computer system stops displaying the warning.

Risk management and notification logic 60 may include instructions for removing the notification either partially or entirely, such as by gradually fading or otherwise hiding the message. In some embodiments, risk management and notification logic 60 may hide (e.g., fade out) the notification by an amount corresponding to a distance from the predefined proximity to the graphical object, as described further below. The risk management and notification logic 60 may monitor the user's gaze and fade in the message if user returns within a proximity of the graphical object. Note that, the risk management and notification logic 60 may not fade in the message when the user's gaze returns within the predefined proximity if the risk management and notification logic 60 determines that the user has previously read the notification. The risk management and notification logic 60 may also display different formats and versions of the warning. Some may be shown in more details, while others may be represented, for example, as a simple sign or a beep.

Operating system 65 may be implemented in software and may include instructions that, when executed by processor 10, may control execution or operation of various resources of the computer system 5. Through interfaces of the computer system 5, processor 10 may execute operating system 65 to control an eye tracking system (e.g., eye tracker 48) and read sensor data, execute risk management and notification logic 60, execute application 55, receive inputs via input interface 35, and provide the GUI or other content to a user via display device 30. Operating system 65 may include other functionality ascribed to software operating systems as may be generally known in the art.

Figure 2:
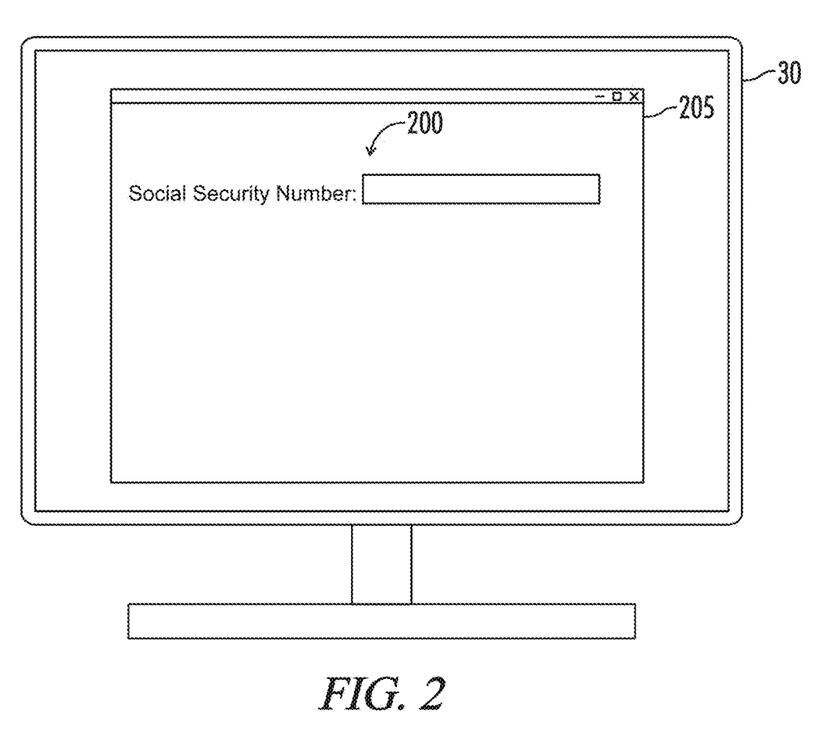
FIG. 2 depicts an exemplary embodiment of a display device of a computing system showing a graphical object associated with a security risk.
Figure 3:
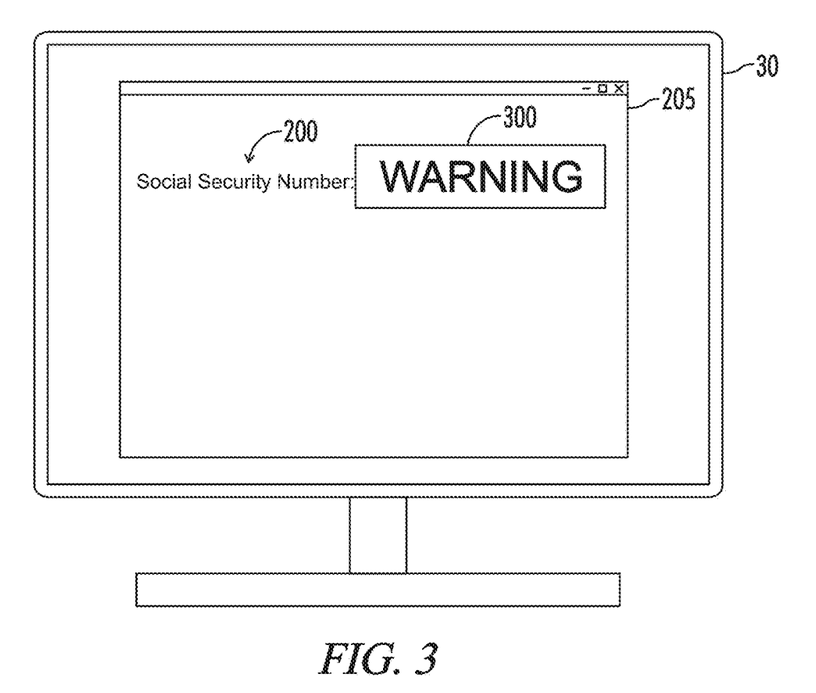
FIG. 3 depicts an exemplary embodiment of a display device of a computing system showing a warning message and a graphical object associated with a security risk.
Figure 4:
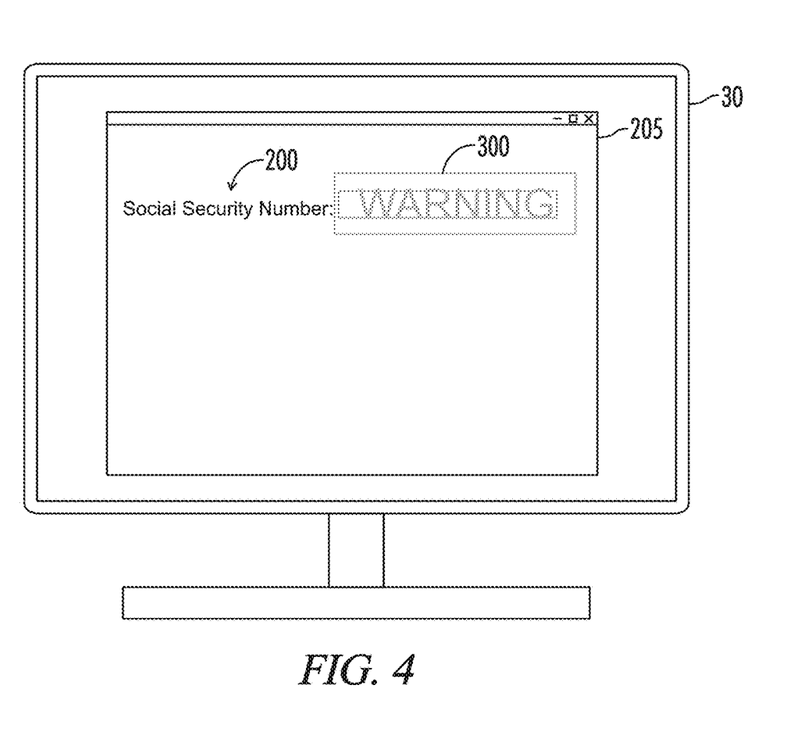
FIG. 4 depicts an exemplary embodiment of a display device of a computing system showing an automatically faded warning message and a graphical object associated with a security risk.

An exemplary operation of the computer system 5 will be described in more detail below with reference to FIGS. 2-4. In this regard, FIG. 2 depicts an exemplary embodiment of a display device 30 of a computing system 5 showing a graphical object 200 associated with a security risk (e.g., as identified based on instructions in risk management and notification logic 60). The graphical object 200 is displayed within a GUI 205 and is visible on display device 30. In the embodiment of FIGS. 2-4, graphical object 200 is depicted as text and an input field, but other graphical objects (e.g., icons, images, drawings, photos, videos, computer generated graphics, files, etc.) are possible. As noted above, the GUI 205 may be generated and displayed based on instructions in memory 20, such as application 55 and operating system 65. The computer system 5 (based on instructions in risk management and notification logic 60) may note the location (e.g., screen coordinates) of the graphical object 200 on the display device 30 for comparison with a location of a user's gaze.

Eye tracking system 40 may provide eye-gaze data from eye tracker 48 indicating locations (e.g., screen coordinates) on display device 30 where a user is gazing. The computer system 5 may monitor the location of the user's gaze (e.g., at processor 10, based on instructions in eye tracking logic 50) within the GUI 205, and, when the user's gaze comes within a predefined distance of the graphical object 200, may display a notification 300 in response, such as depicted in FIG. 3.

As shown by FIG. 3, a notification 300 may be displayed when the user is gazing at a location that is within a predefined proximity of the graphical object 200. As an example, the notification 300 may be displayed when the distance between the location of the user's eye gaze and the graphical object is less than a predefined threshold. The notification 300 may itself be a graphical object (e.g., an icon, a window, or text box) displayed within GUI 205, and may comprise various information (e.g., text, illustrations, etc.) warning the user about the details of the risk associated with graphical object 200. In some embodiments, the notification 300 may be displayed at various locations associated with the graphical object 200. The notification 300 may be displayed at a location that partially or completely obscures the user's view of graphical object 200, thereby forcing or encouraging the user to view the notification 300 before interacting with (e.g., selecting) the graphical object 200. In some embodiments, the notification 300 may be displayed at a location corresponding to the user's gaze location that is within the predefined proximity of the graphical object 200. As an example, a predefined point of the message (e.g., the center of the message) may be positioned at the location where the user is gazing. Notification 300 may be displayed at other locations within the GUI 205 corresponding to the graphical object 200 in other embodiments.

Computer system 5 may continue to display the notification 300 (e.g., based on instructions in risk management and notification logic 60) until the user is no longer gazing at a location within a predefined proximity to the graphical object 200 (e.g., based on instructions in eye tracking logic 50 and eye-gaze data from eye tracking system 40). As depicted by FIG. 4, the notification 300 may be removed when the user's gaze moves to a location outside of a predefined proximity (e.g., to a distance from the graphical object that is greater than a predefined threshold, which may be the same or different than the threshold used to determine whether the display the notification). In some embodiments, the notification 300 may be removed by gradually fading out the notification 300 within the GUI 205 so that the message 300 appears to disappear gradually from the user's view on the display device 30.

In some embodiments, an amount by which the message 300 is faded out or "disappears" may correspond to a distance between the location where the user is gazing and a margin or boundary of the predefined proximity (e.g., as determined by risk management and notification logic 60 based on eye-gaze data from eye tracking system 40 and eye-gaze location indicated by eye tracking logic 50). The message 300 may appear to fade or disappear more as the user's gaze moves further away from the predefined proximity. The notification 300 may be redisplayed (e.g., faded in or gradually reappearing) if the computer system 5 determines that the user's gaze is returning toward the predefined proximity (e.g., based on instructions in risk management and notification logic 60, eye tracking logic 50, and eye-gaze data from eye tracking system 40). In some embodiments, the message may not be redisplayed if the computer system 5 determines the user has already read the message. The message 300 may be displayed and removed using other techniques and in response to different events in other embodiments.

Figure 5:
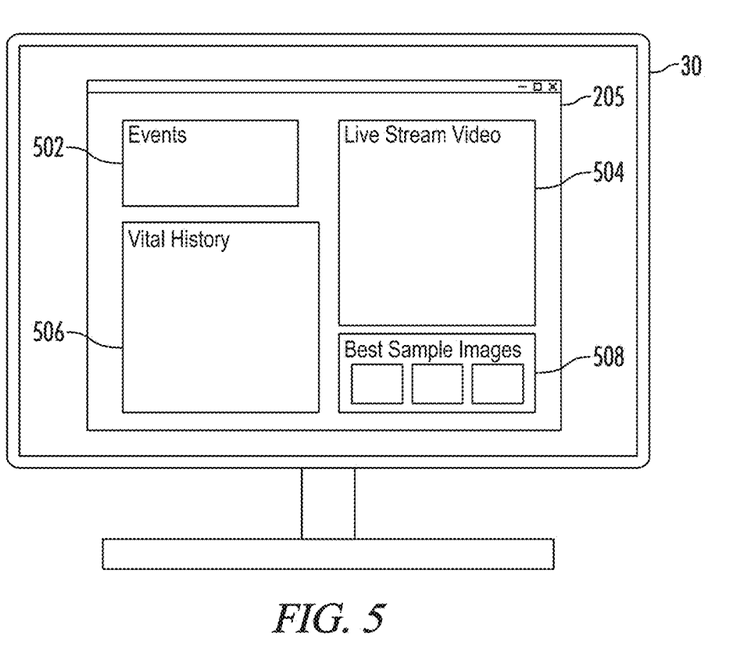
FIG. 5 depicts an exemplary embodiment of a display device of a computing system showing a plurality of graphical objects.

FIG. 5 depicts an exemplary embodiment of a display device 30 of a computing system 5 showing a plurality of graphical objects. The plurality of graphical objects may comprise objects, for example in telemedicine, indicative of events information 502, live stream video 504, vital history 506 and best sample images 508, but other graphical objects are possible.

In some embodiments, the computing system 5 may display a notification or warning if a user's attention should be directed to a location (e.g., one of the plurality of graphical objects) other than where the user is looking (a different one of the plurality of graphical objects). Various events may require the user's attention, or present risk if the user is not looking at a particular location (e.g., if the computer system 5 detects that a driver has been looking at a vehicle's infotainment system too long instead of watching the road). The computer system 5 may display a notification or warning (e.g., based on instructions in risk manager 60) directing the user to look at an appropriate location. In some embodiments, the computer system 5 may direct a user's attention to an event that may be of interest to a user, regardless of whether risk is present. Notifications directing a user's attention elsewhere may be provided for in other situations and for other purposes in other embodiments.

As an example, in some embodiments, a user may be tasked with monitoring information within the GUI 205, including events indicated on a live stream video feed via live stream video 504. The computer system 5 may monitor locations on display device 30 (e.g., within the GUI 205) where a user is gazing as described herein (e.g., using eye-gaze data from eye tracking system 40 at processor 10, based on instructions in eye tracking logic 50). A user's gaze may fixate at a location corresponding to a different graphical object (e.g., other than live stream video 504) for a period of time. If the computer system 5 determines that the graphical object live stream video 504 needs imminent attention on the display device 30 (e.g., based on instructions in risk management and notification logic 60), the computer system 5 may determine the location of the user's gaze.

Figure 6:
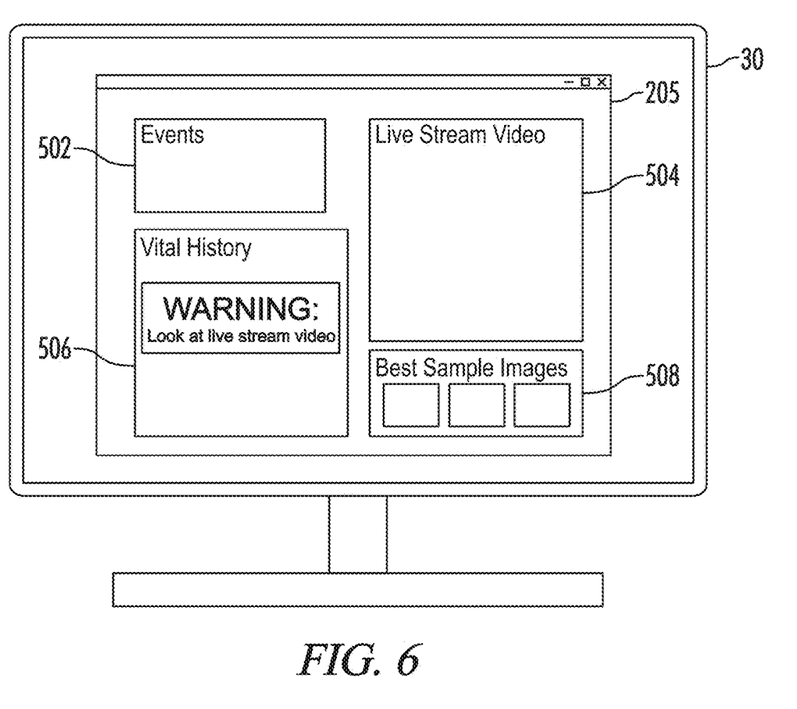
FIG. 6 depicts an exemplary embodiment of a display device of a computing system showing a warning message directing the user to look at another location of the display device.

If the user's gaze is not within the region of live stream video 504, a notification 300 will be displayed near the location of the user's current gaze in response, such as depicted in FIG. 6. If the user does not read the message and the risk persists (e.g., as determined based on instructions in risk management and notification logic 60), additional warnings may be displayed near the user's current gaze location (possibly a new location). If the user read the message or the user's gaze moves to the region that needs imminent attention (e.g., live stream video 504), the message will hide or fade away, as described herein.

Figure 7:
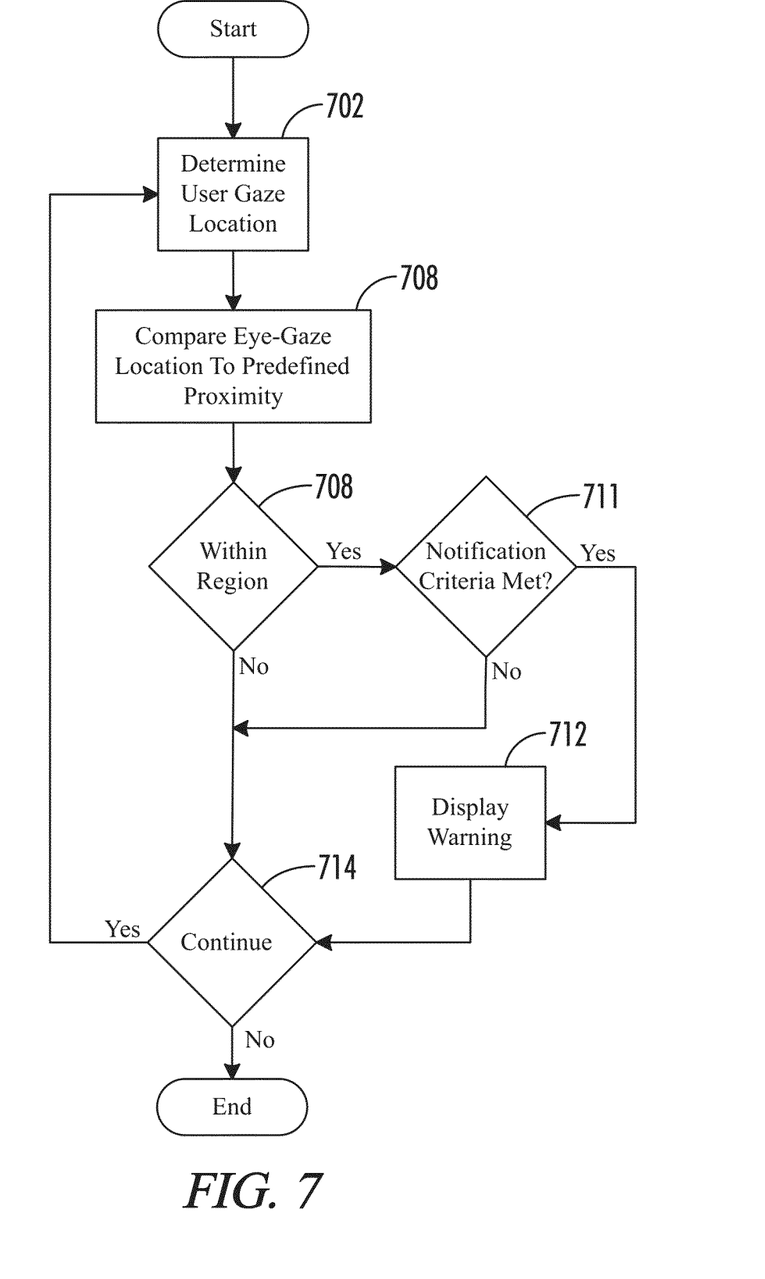
FIG. 7 is a flowchart illustrating an exemplary method for providing a gaze-based warning to a user of a computing system.

FIG. 7 is a flowchart illustrating an exemplary method for providing a gaze-based security warning to a user of a computing system 5. At step 702, the user's eye-gaze location may be measured, such as by eye tracking logic 50, based on eye-gaze data from eye tracking system 40. The eye gaze tracking may be performed using eye-gaze data provided approximately continuously via eye tracking system 40 to monitor the location on display device 30 (or field of view) of the user's eye gaze over time (e.g., at any given moment).

Note that, while the user's eye gaze is being tracked, a GUI may be displayed via display device 30, such as when a processor 10 of the computing system 5 executes application 55. The GUI may comprise a plurality of graphical objects, as described above, various of which may be interactive to a user. When the GUI is displayed, one or more risks may be detected, such as based on processor 10 executing instructions stored as risk management and notification logic 60. A risk may be of various types, such as malicious objects (e.g., malicious code, unnecessary private information exposure) that have not been confirmed to be safe, and may be associated with one or more of the plurality of graphical objects displayed within the GUI. The computer system 5 (e.g., risk management and notification logic 60) may associate a security risk with at least one of the plurality of graphical objects and may note the location of the graphical object associated with the risk within the GUI as displayed at display device 30. After the user's gaze location has been determined, processing may proceed to step 708.

At step 708, a location of the user's eye-gaze location and a predefined region (e.g., an area around the graphical object) may be compared, such as by risk management and notification logic 60 based on eye-gaze data from the eye tracking system 40. After the user's gaze location has been compared to the predefined region, processing may continue to step 710, where a determination may be made whether the user's eye-gaze location is within the predefined region indicating that user interaction with the graphical object may be imminent. If the user's eye gaze location is within the predefined proximity, processing may proceed to step 711. If not, processing may continue to step 714.

At step 711, computer system 5 (e.g., risk management and notification logic 60) may access notification criteria and assess whether one or more of the criteria is satisfied (e.g., the user has not read the notification yet, and that the user's gaze has fixated at a location associated with a risk and that the risk exists). If computer system 5 determines that one or more of the warning criteria will be satisfied, processing may proceed to step 712. If not (e.g., a user has already read the notification), processing may continue to step 714.

At step 712, a notification related to the risk may be displayed, such as at a location corresponding to the graphical object. The notification may be displayed based on a determination (e.g., at steps 710 and 711) that the user's eye-gaze is within the predefined region to the graphical object. The notification may be displayed at or near the location of the graphical object within the GUI or at another location on the display device 30. In some embodiments, the notification may be displayed sufficiently close to the graphical object to indicate that the message is related to the graphical object.

After the notification is displayed, the location of the user's gaze may be measured, and the message may be removed as described above if the user's eye gaze is no longer within the predefined region. If the user's gaze returns, and the user has not read the message, it may be displayed again. After the notification has been displayed, processing may proceed to step 714 to determine whether monitoring of security risks is to be continued. If so, processing may return to step 702 where the location of the user's gaze may be measured again.

It should be noted that similar techniques may be used to warn users of other types of risks. As an example, a user wearing a head mounted display, such as eyeglasses configured to display images to the user, may be warned when he or she encounters various real-world risks. In this regard, a head mounted display may have a wireless communication connection that permits it to use a network (e.g., the Internet) to communicate with a remote server so that one or more processors on the head mounted display and/or the server may assess the security risks associated with the real-world objects viewable through the head mounted display. For example, when a person approaches the user, the head mounted display may be configured to capture an image of the person with a camera and communicate the image with a server that is configured to identify the person based on the image and check the person's background records using information stored at or otherwise accessible to the server. If the person is deemed to be a security risk based on the background check (e.g., if the person has a criminal past suggesting that he or she is a security risk), the head mounted display may display a warning that appears near the person according to techniques similar to those for displaying warning messages for computer security risks. In another example, using a location sensor (e.g., GPS) or images of a scene captured by a camera of the head mounted display or otherwise, it may be possible for the server to determine that the user is looking at a dangerous geographic location, such as a beach where a relatively high number of drownings or shark attacks have occurred. In response, the head mounted display may display a message warning the user of the danger according to techniques similar to those for displaying warning messages for computer security risks. In other examples, the user may be notified about other types of risks.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A computer system, comprising:
   a display device;
   an eye tracker for sensing at least one eye of a user;
   at least one processor coupled to the display device and the eye tracker, the at least one processor configured to:
   track a gaze of a user based on eye-gaze data from the eye tracker indicating locations at which the user is gazing over time;
   display a graphical user interface (GUI) via the display device, wherein the graphical user interface has a plurality of graphical objects;
   associate one of the graphical objects with a security risk related to the computer system;
   determine whether the gaze of the user is within a predefined region of the one graphical object associated with the security risk based on the eye-gaze data; and
   display a warning message related to the security risk on the display device in response to a determination by the at least one processor that the gaze of the user is within the predefined region.

2. The computer system of claim 1, wherein the at least one processor is configured to hide the warning message based on the eye-gaze data.

3. The computer system of claim 2, wherein the at least one processor is configured to hide the warning message in response to a determination based on the eye-gaze data that a gaze of the user has moved away from the warning message.

4. The computer system of claim 2, wherein the at least one processor is configured to hide the warning message in response to a determination based on the eye-gaze data that a gaze of the user has moved out of the predefined region.

5. The computer system of claim 1, wherein the at least one processor is configured to determine, based on the eye-gaze data, whether the user has read the warning message, and wherein the at least one processor is configured to control the warning message based on whether the user is determined to have read the warning message.

6. The computer system of claim 5, wherein the at least one processor is configured to hide the warning message in response to a determination that the user has read the warning message.

7. The computer system of claim 5, wherein the at least one processor is configured to hide the warning message based on the eye-gaze data.

8. The computer system of claim 6, wherein the at least one processor, after hiding the message, is configured to determine whether to display the warning message as the gaze of the user moves toward the one graphical object based on whether the user is determined to have read the warning message.

9. The computer system of claim 1, wherein the at least one processor is configured to fade out the warning message as the gaze of the user moves away from the one graphical object.

10. The computer system of claim 9, wherein the at least one processor is configured to fade in the warning message as the gaze of the user moves toward the one graphical object.

11. The computer system of claim 1, wherein the at least one processor is configured to fade the warning message based on a location of the gaze of the user.

12. The computer system of claim 1, wherein the at least one processor is configured to display the warning message within the GUI at a location corresponding to the one graphical object.

13. A computer system, comprising:
a display device;
an eye tracker for sensing at least one eye of a user;
at least one processor coupled to the display device and the eye tracker, the at least one processor configured to:
track a gaze of a user based on eye-gaze data from the eye tracker indicating locations at which the user is gazing over time;
display a graphical user interface (GUI) via the display device, wherein the graphical user interface has a plurality of graphical objects;
associate one of the graphical objects with a risk;
determine whether the gaze of the user is within a predefined region of the one graphical object associated with the risk based on the eye-gaze data; and
display a notification related to the risk on the display device based on whether the gaze of the user is determined by the at least one processor to be within the predefined region.

14. The computer system of claim 13, wherein the at least one processor is configured to hide the notification based on the eye-gaze data.

15. The computer system of claim 14, wherein the at least one processor is configured to hide the notification in response to a determination based on the eye-gaze data that a gaze of the user has moved away from the notification.

16. The computer system of claim 14, wherein the at least one processor is configured to hide the notification in response to a determination based on the eye-gaze data that a gaze of the user has moved to the predefined region.

17. The computer system of claim 13, wherein the at least one processor is configured to determine, based on the eye-gaze data, whether the user has read the notification, and wherein the at least one processor is configured to control the notification based on whether the user is determined to have read the notification.

18. The computer system of claim 17, wherein the at least one processor is configured to hide the notification in response to a determination that the user has read the notification.

19. The computer system of claim 13, wherein the at least one processor is configured to fade out the notification as the gaze of the user moves within the predefined region to the one graphical object.

20. The computer system of claim 19, wherein the at least one processor is configured to fade in the notification as the gaze of the user moves away from the predefined region.

21. The computer system of claim 13, wherein the at least one processor is configured to fade the notification based on a location of the gaze of the user.

22. The computer system of claim 13, wherein the at least one processor is configured to display the warning message within the GUI at a location corresponding to a location where the user is gazing.

23. A method, comprising:
tracking at least one eye of a user with an eye tracker;
determining a location on a display device of a computer system where the user is looking based on the tracking;
monitoring a gaze of the user over time based on the tracking;
displaying on the display device a graphical object;
associating the graphical object with a risk related to the computer system;
determining whether the gaze of the user is within a predefined region of the graphical object associated with the risk based on the monitoring; and
displaying a warning message related to the risk on the display device based on the determining.

24. The method of claim 23, further comprising determining whether the user is fixated on the graphical object based on the monitoring, wherein the displaying is based on the determining whether the user is fixated on the graphical object.

25. The method of claim 23, further comprising hiding the warning message based on the monitoring.

26. The method of claim 23, further comprising fading the warning message based on the monitoring.

27. The method of claim 23, further comprising:
determining whether the user has read the warning message based on the monitoring; and
controlling the warning message based on the determining whether the user has read the warning message.

* * * * *

UNITED STATES PATENT AND TRADEMARK OFFICE
CERTIFICATE OF CORRECTION

PATENT NO. : 10,162,651 B1  
APPLICATION NO. : 15/438335  
DATED : December 25, 2018  
INVENTOR(S) : Zhu et al.

Page 1 of 1

It is certified that error appears in the above-identified patent and that said Letters Patent is hereby corrected as shown below:

In the Specification

Column 1, Line 16: Replace "249506" with --CNS-1220026--

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*